United States Patent [19]
Savalle et al.

[11] Patent Number: 5,915,016
[45] Date of Patent: Jun. 22, 1999

[54] IDENTITY CARD READER DEVICE

[75] Inventors: Patrick Savalle, Rueil Malmaison; Roger Petit, Sartrouville, both of France

[73] Assignee: Alcatel Mobile Phones, Paris, France

[21] Appl. No.: 08/768,396

[22] Filed: Dec. 18, 1996

[30] Foreign Application Priority Data

Dec. 19, 1995 [FR] France .................................. 95 15054

[51] Int. Cl.⁶ .................................................. H04M 1/00
[52] U.S. Cl. ........................... 379/433; 235/441; 235/492
[58] Field of Search ............................ 235/441; 379/433, 379/369

[56] References Cited

U.S. PATENT DOCUMENTS 5,157,724  10/1992  Schmidt ................................... 379/369

FOREIGN PATENT DOCUMENTS

2633750A1  1/1990  France .
2653249A1  4/1991  France .
2683355A1  5/1993  France .
2687815A1  8/1993  France .

OTHER PUBLICATIONS

*Patent Abstracts of Japan*, vol. 10, No. 84 9P–422) [214], Apr. 3, 1986 corresponding to JP–A–60 220482 (Danippon Insatsu K.K.) dated Nov. 5, 1985.

*Primary Examiner*—Harold I. Pitts
*Attorney, Agent, or Firm*—Sughrue, Mion, Zinn, Macpeak & Seas, PLLC

[57] ABSTRACT

A portable telephone has a keypad, a screen and a plate under the keypad and including some of the electronic circuits of the telephone and contacts actuated by keys of the keypad to operate the telephone. An identity card is inserted in a cavity under the plate so as to place it in contact with an identity card connector located under the "navigator" key of the keypad on the opposite side of the plate to the identity card. The connections between the connector and the identity card are made by contacts carried by the connector through an opening in the plate. This saves space and reduces the thickness of the telephone.

4 Claims, 2 Drawing Sheets

IDENTITY CARD READER DEVICE

BACKGROUND OF THE INVENTION

1. Field of the Invention

The present invention concerns portable telephones into which the user inserts an identity card to enable operation of the telephone, and in particular an identity card reader device integrated into a portable telephone.

2. Description of the Prior Art

Using a portable telephone entails using a user identity card usually called and SIM card in the European market and which must be recognized by the telephone before it is used.

Stand-alone SIM card readers are available from distributors. However, these stand-alone readers are bulky because of the connectors required to provide the interface between the reader and the telephone.

Integrating the SIM card reader into the telephone has therefore been envisaged, as in the case of the card reader described in application FR-A-2 687 815, which has a set of electrical contacts embedded in a substantially plane platform and a cover plate spaced from the platform so that the cover plate and the platform form a cavity into which the identity card can be inserted and pressed against the electrical contacts of the platform. Unfortunately the contacts on the platform making the connection to the identity card take up space and occupy a non-negligible thickness in this type of telephone, in which optimal use of space is a major preoccupation.

SUMMARY OF THE INVENTION

This is why an aim of the invention is to provide an identity card reader device in a portable telephone comprising a keypad, a plate under the keypad including contacts actuated by keys of the keypad to operate the telephone and a slot under said plate for inserting the identity card so as to place it in contact with an identity card connector. The identity card connector is under a key of the keypad on the opposite side of said plate to said identity card, the connections between said connector and said identity card being effected by means of contacts carried by said connector through an opening in said plate, which saves space and reduces the thickness of the telephone.

The following description of the invention, which is purely illustrative, is intended to provide a better understanding of the features of the invention. It is given with reference to the accompanying drawings.

DETAILED DESCRIPTION OF THE PREFERRED EMBODIMENT

Figure 1:
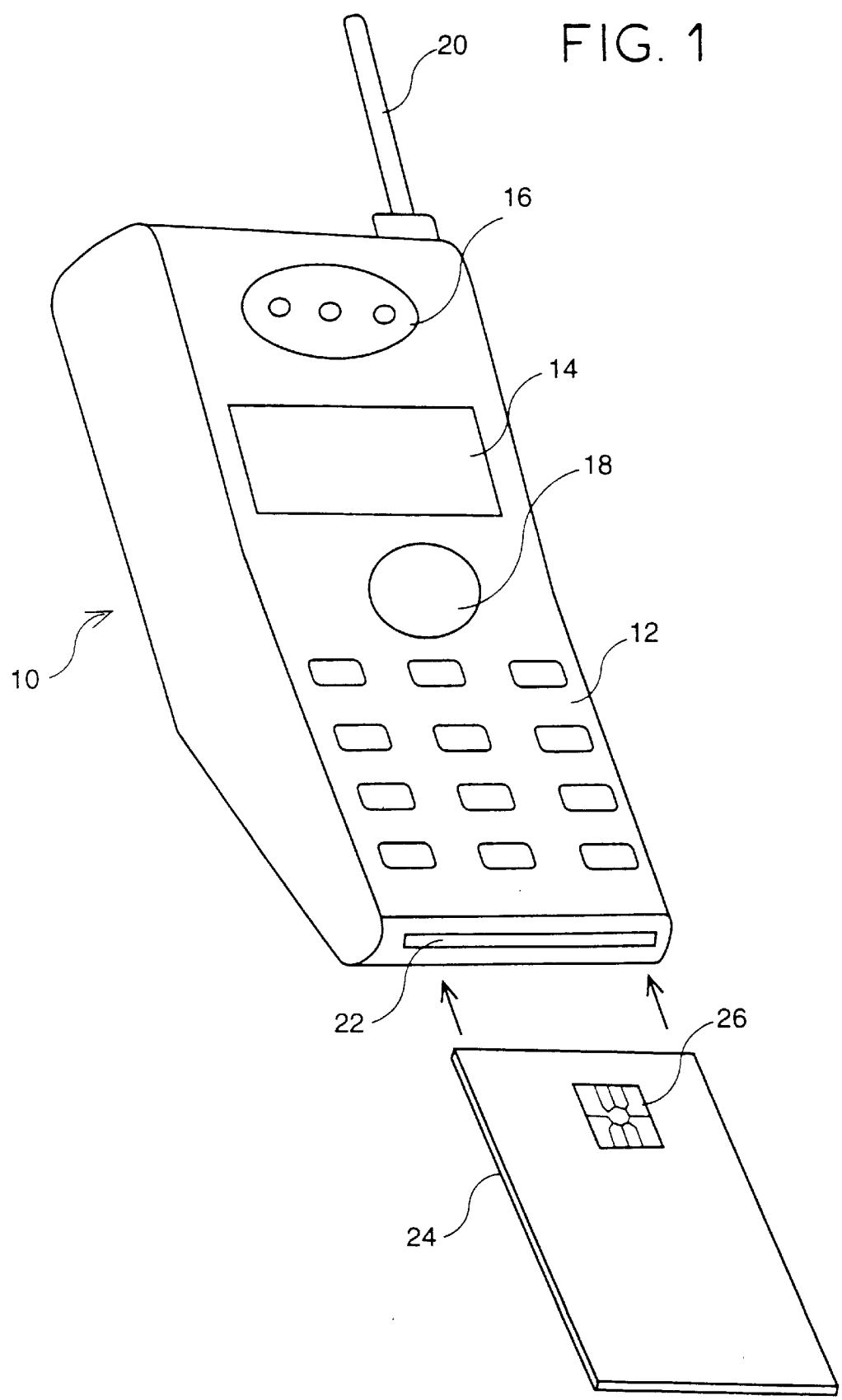
FIG. 1 is a diagrammatic representation of a portable telephone having a slot at the front for inserting an identity card and a "navigator" type key.

The portable telephone shown in FIG. 1 comprises a casing 10 having on its front face a touch keypad 12, a screen 14 and an earpiece 16. The keypad includes a so-called navigator key 18 enabling the user to move a cursor on the screen, for example to scroll through a menu. The user applies an upward pressure to the key to move the cursor upwards, a downward pressure to the key to move the cursor downwards, a leftward pressure to the key to move the cursor to the left and a rightward pressure to the key to move the cursor to the right.

The telephone has an antenna 20 and a microphone at the lower end that has not been shown to avoid masking the slot 22 into which a user identity card or SIM card 24 is inserted.

The identity card 24 includes a microchip 26 on the top adapted to locate under the navigator key 14 (see below). Note that the microchip 26 includes a certain number of contacts (eight in theory) and is visible to the user when the card is inserted, as has become the norm for all devices into which an identity card must be inserted to enable the device to operate.

Figure 2:
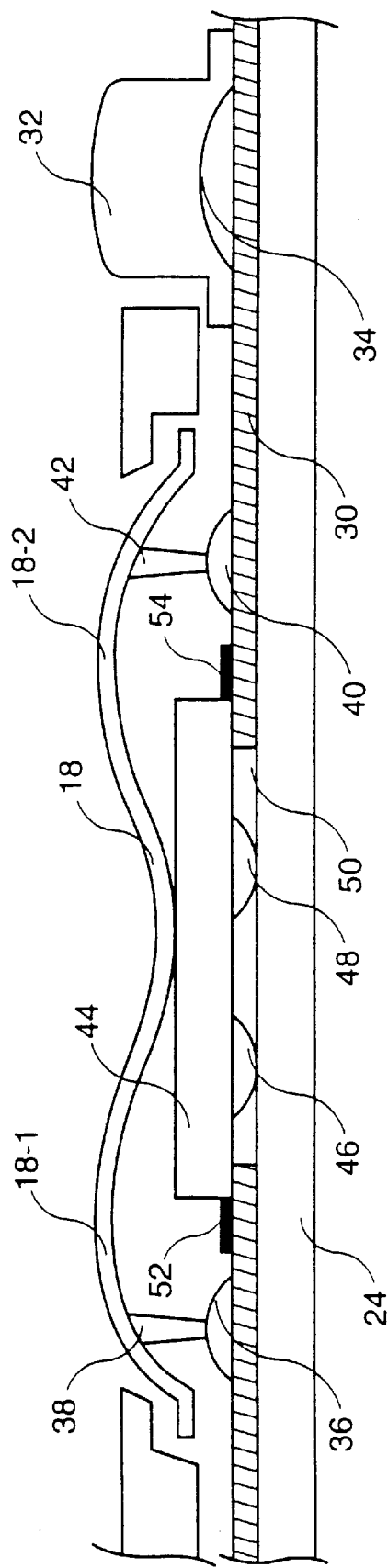
FIG. 2 is a sectional view of the part of the telephone including the "navigator" type key and the identity card connector.

As shown in FIG. 2, the identity card 24 has been inserted into the telephone under the flexible plate 30 carrying some of the electronic circuits of the telephone and also the contacts actuated by the keys of the keypad. Thus the key 32 actuates a contact 34 when the user presses it.

The keypad also includes the navigator key 18 for moving around on the screen. The figure shows a contact 36 actuated by a connecting member 38 when pressure is applied to the part 18-1 of the key (to move the cursor upwards) and a contact 40 actuated by a connecting member 42 when pressure is exerted on the part 18-2 of the key (to move the cursor downward).

Under the navigator key and between the connecting members 38 and 42 is a connector 44. It includes contacts 46 and 48 shown diagrammatically in FIG. 2 which, through the opening 50 in the flexible plate 30, provide the electrical connections to the identity card 24 and in particular to the contacts of the microchip integrated into the identity card.

The electrical connections between the connector 44 and the flexible plate 30 are made by means of contacts 52 and 54 on top of the flexible plate 30.

It can therefore be seen that locating the connector providing the electrical connection between the flexible plate and the identity card under a large navigator type key and on the side opposite the identity card achieves a significant saving of space and a non-negligible reduction in thickness. Further, the connector provides a bearing point for the navigator key when pressure is applied to its periphery to move the cursor on the screen.

Although the invention has been described with reference to one preferred embodiment, it is evident that many modifications of detail may be made thereto without departing from the scope of the invention. Thus the key 18 under which the connector 44 is provided may be a key other than the navigator key, but nevertheless sufficiently large for its central location having no contact with the flexible plate to accommodate the connector.

Although the invention applies in particular to a portable telephone, in general it may be used in any portable device into which an identity card must be inserted for the device to be operated.

There is claimed:

1. An identity card reader device integrated into a portable device including a touch keypad, a plate under said keypad including contacts actuated by keys of said keypad to operate said device and a slot under said plate for inserting said identity card so as to place it in contact with an identity card connector, wherein said identity card connector is under a key of said keypad on the opposite side of said plate to said identity card, the connections between said connector and said identity card being made by contacts carried by said connector through an opening in said plate.

2. The device claimed in claim 1 wherein said key under which said connector is located is a large "navigator" type key used to move a cursor in all directions on a screen of said portable device.

3. The device claimed in claim 1 wherein said connections between said contacts of said connector and said identity card are made by contacts of a microchip carried by said identity card.

4. The device claimed in claim 1 used in a portable telephone, said identity card being an SIM card.

* * * * *